United States Patent
Kim et al.

(10) Patent No.: US 11,806,697 B2
(45) Date of Patent: Nov. 7, 2023

(54) CATALYST COMPOSITION, METHOD OF PREPARING THE COMPOSITION, METHOD OF PREPARING CONJUGATED DIENE-BASED POLYMER BY USING THE COMPOSITION, AND CONJUGATED DIENE-BASED POLYMER PREPARED BY THE METHOD OF PREPARING THE POLYMER

(71) Applicant: LG Chem, Ltd., Seoul (KR)

(72) Inventors: Su Hwa Kim, Daejeon (KR); Hyo Jin Bae, Daejeon (KR); Kyoung Hwan Oh, Daejeon (KR)

(73) Assignee: LG Chem, Ltd.

( * ) Notice: Subject to any disclaimer, the term of this patent is extended or adjusted under 35 U.S.C. 154(b) by 525 days.

(21) Appl. No.: 17/053,564

(22) PCT Filed: Dec. 13, 2019

(86) PCT No.: PCT/KR2019/017737
§ 371 (c)(1),
(2) Date: Nov. 6, 2020

(87) PCT Pub. No.: WO2020/122680
PCT Pub. Date: Jun. 18, 2020

(65) Prior Publication Data
US 2021/0229083 A1    Jul. 29, 2021

(30) Foreign Application Priority Data
Dec. 13, 2018 (KR) .................. 10-2018-0161089

(51) Int. Cl.
*B01J 31/02* (2006.01)
*C08F 4/54* (2006.01)
*C08F 236/04* (2006.01)

(52) U.S. Cl.
CPC ........... *B01J 31/0211* (2013.01); *C08F 4/545* (2013.01); *C08F 236/04* (2013.01)

(58) Field of Classification Search
CPC ..... B01J 31/0211; C08F 4/545; C08F 136/06; C08F 236/04; C08F 2500/03
See application file for complete search history.

(56) References Cited

U.S. PATENT DOCUMENTS

| | | | |
|---|---|---|---|
| 6,437,205 B1 | 8/2002 | Miller et al. | |
| 2004/0116638 A1 | 6/2004 | Ozawa et al. | |
| 2014/0350202 A1 | 11/2014 | Thuilliez et al. | |
| 2017/0275401 A1 | 9/2017 | Oh et al. | |
| 2017/0335032 A1 | 11/2017 | McCauley et al. | |
| 2018/0009918 A1 | 1/2018 | Dickstein et al. | |
| 2018/0030173 A1 | 2/2018 | Kang et al. | |
| 2018/0030174 A1 | 2/2018 | Kang et al. | |
| 2018/0037675 A1 | 2/2018 | Kang et al. | |
| 2018/0044452 A1 | 2/2018 | Kang et al. | |
| 2018/0312669 A1 | 11/2018 | Kang et al. | |
| 2019/0367648 A1 | 12/2019 | Kang et al. | |
| 2020/0010596 A1 | 1/2020 | Kim et al. | |
| 2020/0123289 A1 | 4/2020 | Kang et al. | |

FOREIGN PATENT DOCUMENTS

| | | | |
|---|---|---|---|
| CN | 101812151 A | 8/2010 | |
| CN | 103772772 A | 5/2014 | |
| CN | 105985472 A | 10/2016 | |
| CN | 107466299 A | 12/2017 | |
| CN | 107531819 A | 1/2018 | |
| CN | 108884271 A | 11/2018 | |
| EP | 0713885 A1 | 5/1996 | |
| EP | 1939221 A2 | 7/2008 | |
| EP | 3222639 A1 | 9/2017 | |
| JP | 2009013420 A | 1/2009 | |
| JP | 2015506384 A | 3/2015 | |
| JP | 2018503727 A | 2/2018 | |
| JP | 2018505918 A | 3/2018 | |
| KR | 19910008275 B | 4/1989 | |
| KR | 20160064819 A | 6/2016 | |
| KR | 20170000755 A | 1/2017 | |
| KR | 20170075671 A | 7/2017 | |
| KR | 20180004636 A | 1/2018 | |
| KR | 20180065892 A | 6/2018 | |
| KR | 101899637 B1 | 9/2018 | |
| WO | WO2016/209046 | * 12/2016 | ............... C08F 4/54 |

OTHER PUBLICATIONS

Machine translation of KR20170075671. (Year: 2017).*
Extended European Search Report including Written Opinion for Application No. 19897334.9 dated Jun. 25, 2021, pp. 1-6.
International Search Report for Application No. PCT/KR2019/017737 dated Mar. 25, 2020, 3 pages.
Search Report dated Oct. 11, 2022 from the Office Action for Chinese Application No. 201980030294.3 dated Oct. 18, 2022, pp. 1-3.

* cited by examiner

*Primary Examiner* — Brian A McCaig
(74) *Attorney, Agent, or Firm* — Lerner David LLP

(57) ABSTRACT

A catalyst composition capable of forming a conjugated diene-based polymer having a narrow molecular weight distribution by being used in polymerization of a conjugated diene-based monomer, a method of preparing the same, a method of preparing a conjugated diene-based polymer using the catalyst composition, and a conjugated diene-based polymer prepared by the method of preparing the polymer are provided. Since the catalyst composition according to the present invention includes a polymer having a number-average molecular weight of 3,000 g/mol to 10,000 g/mol and including a conjugated diene-based monomer-derived unit, the catalyst composition may be used in the polymerization of a conjugated diene-based monomer to prepare a conjugated diene-based polymer having a narrower molecular weight distribution in comparison to a conventional neodymium catalyst composition.

12 Claims, No Drawings

CATALYST COMPOSITION, METHOD OF PREPARING THE COMPOSITION, METHOD OF PREPARING CONJUGATED DIENE-BASED POLYMER BY USING THE COMPOSITION, AND CONJUGATED DIENE-BASED POLYMER PREPARED BY THE METHOD OF PREPARING THE POLYMER

CROSS-REFERENCE TO RELATED APPLICATIONS

The present application is a national stage entry under 35 U.S.C. § 371 of International Application No. PCT/KR2019/017737 filed on Dec. 13, 2019, which claims priority to Korean Patent Application No. 10-2018-0161089, filed on Dec. 13, 2018, in the Korean Intellectual Property Office, the disclosures of which are incorporated herein in their entirety by reference.

TECHNICAL FIELD

The present invention relates to a catalyst composition capable of forming a conjugated diene-based polymer having a narrow molecular weight distribution by being used in the polymerization of a conjugated diene-based monomer, a method for preparing the composition, a method of preparing a conjugated diene-based polymer by using the catalyst composition, and a conjugated diene-based polymer prepared by the method of preparing the polymer.

BACKGROUND ART

Recently, automobiles with lower fuel consumption are required as interest in energy saving and environmental issues increases. As one of methods to realize this, a method of decreasing heat generation of a tire by using an inorganic filler, such as silica or carbon black, in a rubber composition for forming a tire has been proposed, but, since dispersion of the inorganic filler in the rubber composition was not easy, there was a limitation in that overall physical properties including abrasion resistance, crack resistance, or processability of the rubber composition were rather deteriorated.

In order to address this limitation, as a method of increasing dispersibility of the inorganic filler, such as silica or carbon black, in the rubber composition, a method of modifying a polymerizable active site of a conjugated diene-based polymer obtained by anionic polymerization using organolithium with a functional group capable of interacting with the inorganic filler has been developed. Specifically, a method of modifying a polymerization active end of a conjugated diene-based polymer with a tin-based compound or introducing an amino group, or a method of modifying with an alkoxysilane derivative has been proposed.

However, during the preparation of a rubber composition using the conjugated diene-based polymer modified by the above-described method, low heat generation may be ensured, but an effect of improving physical properties, such as abrasion resistance and processability, of the rubber composition was not sufficient.

As another method, a method of modifying a living active terminal with a specific coupling agent or modifier has been developed in a living polymer obtained by coordination polymerization using a catalyst which includes a lanthanide rare earth element compound. However, in a conventionally known catalyst containing a lanthanide rare earth element compound, since activity of the resulting living terminal is weak and a terminal modification ratio is low, an effect of improving physical properties of the rubber composition is insignificant.

PRIOR ART DOCUMENT (Patent Document 1) KR 1991-0008275 B1

DISCLOSURE OF THE INVENTION

Technical Problem

The present invention provides a catalyst composition capable of forming a conjugated diene-based polymer having a narrow molecular weight distribution by being used in the polymerization of a conjugated diene-based monomer.

The present invention also provides a method of preparing the catalyst composition.

The present invention also provides a method of preparing a conjugated diene-based polymer by using the catalyst composition.

The present invention also provides a conjugated diene-based polymer prepared by the method of preparing the polymer.

Technical Solution

According to an aspect of the present invention, there is provided a catalyst composition including a polymer, wherein the polymer includes a neodymium compound-derived unit; an alkylating agent-derived unit; and a conjugated diene-based monomer-derived unit, and has a number-average molecular weight of 3,000 g/mol to 10,000 g/mol.

According to another aspect of the present invention, there is provided a method of preparing the catalyst composition which includes steps of: preparing a chlorinated reactant by reacting a neodymium compound, an alkylating agent, a first conjugated diene-based monomer, and a halide in the presence of a hydrocarbon solvent (step 1); and reacting the chlorinated reactant with a second conjugated diene-based monomer (step 2), wherein the second conjugated diene-based monomer is used in an amount of 200 mol to 900 mol based on 1 mol of neodymium in the neodymium compound.

According to another aspect of the present invention, there is provided a method of preparing a neodymium-catalyzed conjugated diene-based polymer which includes: polymerizing a conjugated diene-based monomer in the presence of the catalyst composition, wherein the catalyst composition includes a polymer having a number-average molecular weight of 3,000 g/mol to 10,000 g/mol and including a neodymium compound-derived unit; an alkylating agent-derived unit; and a conjugated diene-based monomer-derived unit.

According to another aspect of the present invention, there is provided a neodymium-catalyzed conjugated diene-based polymer prepared by the above method of preparing a neodymium-catalyzed conjugated diene-based polymer, wherein a –S/R (stress/relaxation) value at 100° C. is in a range of 0.6 to 0.9, and a molecular weight distribution is in a range of 1.0 or more to less than 3.0.

Advantageous Effects

Since a catalyst composition according to the present invention includes a polymer having a number-average molecular weight of 3,000 g/mol to 10,000 g/mol and including a conjugated diene-based monomer-derived unit, the catalyst composition may be used in polymerization of a conjugated diene-based monomer to prepare a conjugated diene-based polymer having a narrower molecular weight distribution in comparison to a conventional neodymium catalyst composition.

Also, since a conjugated diene-based monomer is added to a preforming catalyst composition, in which an alkylation reaction and a chlorination reaction are carried out by sequentially reacting a neodymium compound, an alkylating agent, a conjugated diene-based monomer, and a halide, and a reaction is performed in a method of preparing a catalyst composition according to the present invention, the method may easily prepare a pre-polymerization catalyst composition in which a polymer having a number-average molecular weight of 3,000 g/mol to 10,000 g/mol and including a conjugated diene-based monomer-derived unit is formed.

Furthermore, in a method of preparing a neodymium-catalyzed conjugated diene-based polymer according to the present invention, since a conjugated diene-based monomer is polymerized in the presence of the above-described catalyst composition, the method may prepare a neodymium-catalyzed conjugated diene-based polymer having a molecular weight distribution of 1.0 or more to less than 3.0 while having linearity that is neither low nor high.

In addition, since a neodymium-catalyzed conjugated diene-based polymer according to the present invention is prepared by the above preparation method using the above-described catalyst composition, the neodymium-catalyzed conjugated diene-based polymer may have a narrow molecular weight distribution of 1.0 or more to less than 3.0 while having −S/R of 0.6 to 0.9, and thus, excellent processability, tensile strength, and viscoelastic properties may be obtained when used in a rubber composition.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Terms and measurement methods used in the present invention may be defined as follows unless otherwise defined.

Terms

The term "substitution" used in the present invention may mean that the hydrogen of a functional group, an atomic group or a compound is substituted with a specific substituent, and, if the hydrogen of a functional group, an atomic group or a compound is substituted with a specific substituent, one or a plurality including two or more substituents may be present according to the number of hydrogens present in the functional group, the atomic group or the compound. Also, if a plurality of substituents are present, each substituent may be the same or different.

The term "alkyl group" used in the present invention may mean monovalent aliphatic saturated hydrocarbon, and may include a linear alkyl group, such as methyl, ethyl, propyl, and butyl, and a branched alkyl group such as isopropyl, sec-butyl, tert-butyl, and neo-pentyl.

The term "conjugated diene-based monomer" used in the present invention may include at least one selected from the group consisting of 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene.

The terms "first conjugated diene-based monomer" and "second conjugated diene-based monomer" used in the present invention denote the same conjugated diene-based monomer, wherein the "first" and "second" may be expressions for distinguishing reaction start time of each conjugated diene-based monomer.

The term "derived unit" used in the present invention may mean a component or structure generated from a certain material or may mean the material itself.

[Measurement Methods]

The expression "−S/R (Stress/Relaxation) value" in the present invention denotes a change in stress in response to the same amount of strain, wherein, after a polymer was left standing for 30 minutes or more at room temperature (23±5° C.), 27±3 g of the polymer was taken and filled into a die cavity, Mooney viscosity was measured with a large rotor at a rotor speed of 2±0.02 rpm at 100° C. using MV2000E (Monsanto Company) while applying a torque by operating a platen, a slope of change in the Mooney viscosity obtained while the torque was released was measured, and the −S/R value was expressed as an absolute value thereof.

The expression "Mooney viscosity (MV)" in the present invention is a measure of processability of a polymer, wherein, if the Mooney viscosity is moderately low, flowability is good so that it may be considered that the processability is excellent, its unit is expressed as MU (Money Unit), and the Mooney viscosity is a value of ML(1+4) at 100° C., wherein M represents Mooney, L represents a plate size, 1 represents 1 minute of preheating time, and 4 represents that the value was read after 4 minutes after rotor operation.

Specifically, after the polymer was left standing for 30 minutes or more at room temperature (23±5° C.), 27±3 g of the polymer was taken and filled into a die cavity, the Mooney viscosity was measured with a large rotor at a rotor speed of 2±0.02 rpm at 100° C. using MV2000E (Monsanto Company) while applying a torque by operating a platen.

The expression "Weight-average molecular weight (Mw, g/mol)" and "number-average molecular weight (Mn, g/mol) in the present invention were measured using gel permeation chromatography (GPC) after a sample was dissolved in tetrahydrofuran (THF) at 40° C. for 30 minutes, wherein two PLgel Olexis (product name) columns by Polymer Laboratories and one PLgel mixed-C (product name) column by Polymer Laboratories were combined and used as a column, all newly replaced columns were mixed-bed type columns, and polystyrene was used as a GPC standard material.

The expression "molecular weight distribution (MWD, Mw/Mn)" in the present invention refers to a degree of molecular weight distribution of a polymer, wherein it was calculated as a ratio (Mw/Mn) of the weight-average molecular weight (Mw) to the number-average molecular weight (Mn).

The present invention provides a catalyst composition capable of preparing a conjugated diene-based polymer having a narrow molecular weight distribution by being used in the polymerization of a conjugated diene-based monomer.

The catalyst composition according to an embodiment of the present invention is characterized in that the catalyst composition includes a polymer including a neodymium compound-derived unit; an alkylating agent-derived unit; and a conjugated diene-based monomer-derived unit, wherein the polymer has a number-average molecular weight of 3,000 g/mol to 10,000 g/mol.

Also, the catalyst composition may include the polymer in an amount of 10 wt % or more to less than 60 wt %, for example, 15 wt % or more to 55 wt %, and, in a case in which the amount of the polymer is within the above range, a conjugated diene-based polymer having a narrowly controlled molecular weight distribution may be easily prepared when the catalyst composition is used while not adversely affecting activity of the catalyst composition.

Typically, a preforming catalyst composition, in which alkylation and chlorination are sequentially carried out by sequentially or simultaneously mixing a neodymium compound, an alkylating agent, a conjugated diene-based monomer, and a halide, is being used as a neodymium catalyst composition used in the polymerization of a conjugated diene-based monomer.

However, the catalyst composition of the present invention is one prepared by a preparation method to be described later, wherein it is a pre-polymerization catalyst composition including a polymer, which is prepared by adding a conjugated diene-based monomer to the preforming catalyst composition at a specific ratio with respect to the neodymium compound and being reacted to form the polymer having a number-average molecular weight of 3,000 g/mol to 10,000 g/mol and including a conjugated diene-based monomer-derived unit. Thus, a conjugated diene-based polymer having a narrower molecular weight distribution than a conjugated diene-based polymer prepared in the presence of the typical preforming catalyst composition may be prepared and, as a result, the conjugated diene-based polymer may have excellent processability.

Hereinafter, the catalyst composition according to the embodiment of the present invention will be described in more detail.

The catalyst composition in the present invention is one prepared by the preparation method to be described later, wherein, for example, alkylation and chlorination reactions are sequentially carried out by sequentially or simultaneously mixing a neodymium compound, an alkylating agent, a conjugated diene-based monomer, and a halide to prepare a chlorinated reactant, the catalyst composition may be prepared by further reacting the conjugated diene-based monomer therewith to form a polymer in which at least a portion of the chlorinated reactant and the conjugated diene-based monomer-derived unit are combined, and thus, the catalyst composition may include the chlorinated reactant of the neodymium compound, the alkylating agent, the conjugated diene-based monomer, and the halide and the polymer including the neodymium compound-derived unit, the alkylating agent-derived unit, and the conjugated diene-based monomer-derived unit which is formed by reacting the chlorinated reactant with the conjugated diene-based monomer.

Specifically, the polymer in the present invention is formed by reacting the chlorinated reactant of the neodymium compound, the alkylating agent, the conjugated diene-based monomer, and the halide with the conjugated diene-based monomer, wherein the polymer may have a number-average molecular weight of 3,000 g/mol to 10,000 g/mol, and may have a molecular weight distribution of 2.3 to 2.8. If, in a case in which the polymer has the above number-average molecular weight and molecular weight distribution, a molecular weight distribution of the conjugated diene-based polymer prepared by using the catalyst composition including the polymer may be narrowly controlled.

In the present invention, the neodymium compound may be a compound represented by Formula 1 below.

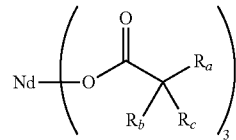

[Formula 1]

In Formula 1, $R_a$ to $R_c$ are each independently hydrogen or an alkyl group having 1 to 12 carbon atoms, but all of $R_a$ to $R_c$ are not hydrogen at the same time.

As another example, in consideration of excellent solubility in a polymerization solvent without a concern for oligomerization, a rate of conversion to a catalytically active species, and the resulting excellent catalytic activity improvement effect, the neodymium compound may specifically be a neodymium compound in which, in Formula 1, $R_a$ is a linear or branched alkyl group having 4 to 12 carbon atoms, and $R_b$ and $R_c$ are each independently hydrogen or an alkyl group having 2 to 8 carbon atoms, but $R_b$ and $R_c$ are not hydrogen at the same time.

As a specific example, in Formula 1, $R_a$ may be a linear or branched alkyl group having 6 to 8 carbon atoms, and $R_b$ and $R_c$ may each independently be hydrogen or a linear or branched alkyl group having 2 to 6 carbon atoms, wherein $R_b$ and $R_c$ may not be hydrogen at the same time, specific examples of the neodymium-based compound may be at least one selected from the group consisting of Nd(2,2-diethyl decanoate)$_3$, Nd(2,2-dipropyl decanoate)$_3$, Nd(2,2-dibutyl decanoate)$_3$, Nd(2,2-dihexyl decanoate)$_3$, Nd(2,2-dioctyl decanoate)$_3$, Nd(2-ethyl-2-propyl decanoate)$_3$, Nd(2-ethyl-2-butyl decanoate)$_3$, Nd(2-ethyl-2-hexyl decanoate)$_3$, Nd(2-propyl-2-butyl decanoate)$_3$, Nd(2-propyl-2-hexyl decanoate)$_3$, Nd(2-propyl-2-isopropyl decanoate)$_3$, Nd(2-butyl-2-hexyl decanoate)$_3$, Nd(2-hexyl-2-octyl decanoate)$_3$, Nd(2-t-butyl decanoate)$_3$, Nd(2,2-diethyl octanoate)$_3$, Nd(2,2-dipropyl octanoate)$_3$, Nd(2,2-dibutyl octanoate)$_3$, Nd(2,2-dihexyl octanoate)$_3$, Nd(2-ethyl-2-propyl octanoate)$_3$, Nd(2-ethyl-2-hexyl octanoate)$_3$, Nd(2,2-diethyl nonanoate)$_3$, Nd(2,2-dipropyl nonanoate)$_3$, Nd(2,2-dibutyl nonanoate)$_3$, Nd(2,2-dihexyl nonanoate)$_3$, Nd(2-ethyl-2-propyl nonanoate)$_3$, and Nd(2-ethyl-2-hexyl nonanoate)$_3$, and, among them, the neodymium compound may be at least one selected from the group consisting of Nd(2,2-diethyl decanoate)$_3$, Nd(2,2-dipropyl decanoate)$_3$, Nd(2,2-dibutyl decanoate)$_3$, Nd(2,2-dihexyl decanoate)$_3$, and Nd(2,2-dioctyl decanoate)$_3$.

Specifically, in Formula 1, $R_a$ may be a linear or branched alkyl group having 6 to 8 carbon atoms, and $R_b$ and $R_c$ may each independently be an alkyl group having 2 to 6 carbon atoms.

As described above, since the neodymium compound represented by Formula 1 includes a carboxylate ligand including alkyl groups of various lengths having 2 or more carbon atoms as a substituent at an α position, coagulation of the compound may be blocked by inducing steric changes around the neodymium center metal, and accordingly, oligomerization may be suppressed. Also, with respect to the neodymium compound, since a ratio of neodymium located in a center portion, which has high solubility in the polymerization solvent and has difficulties in conversion to the catalytically active species, is reduced, the rate of conversion to the catalytically active species is high.

As another example, a weight-average molecular weight (Mw) of the neodymium compound represented by Formula 1 may be in a range of 600 g/mol to 2,000 g/mol. When the neodymium compound has the weight-average molecular weight within the above range, the neodymium compound may more stably exhibit excellent catalytic activity.

Furthermore, the neodymium compound, for example, may have a solubility of about 4 g or more per 6 g of a non-polar solvent at room temperature (25° C.). In the present invention, the solubility of the neodymium compound denotes a degree to which the neodymium compound is clearly dissolved without a turbidity phenomenon, wherein, since the neodymium compound has high solubility as described above, excellent catalytic activity may be achieved.

The neodymium compound, for example, may be used in the form of a reactant with a Lewis base. The reactant may improve the solubility of the neodymium compound in the solvent and may be stored in a stable state for a long period of time by the Lewis base. The Lewis base, for example, may be used in a ratio of 30 mol or less or 1 mole to 10 mol per 1 mol of a neodymium element. Examples of the Lewis base may be acetylacetone, tetrahydrofuran, pyridine, N,N'-dimethylformamide, thiophene, diphenyl ether, triethylamine, an organic phosphorus compound, or a monohydric or dihydric alcohol.

Also, the alkylating agent, as an organometallic compound that may transfer a hydrocarbyl group to another metal, may act as a cocatalyst, wherein the alkylating agent may be used without particular limitation as long as it is used as an alkylating agent during the preparation of a conjugated diene-based polymer.

Furthermore, the alkylating agent may be an organometallic compound or a boron-containing compound, which is soluble in a nonpolar solvent, specifically a nonpolar hydrocarbon solvent, and contains a bond between a cationic metal, such as a Group 1, Group 2, or Group 3 metal, and carbon, and, specifically, the alkylating agent may include at least one selected from the group consisting of an organoaluminum compound, an organomagnesium compound, and an organolithium compound.

The alkylating agent may include an organoaluminum compound of the following Formula 2.

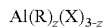 [Formula 2]

In Formula 2,

R is each independently a hydrocarbyl group having 1 to 30 carbon atoms; or a heterohydrocarbyl group having 1 to 30 carbon atoms which contains at least one heteroatom selected from the group consisting of a nitrogen atom, an oxygen atom, a boron atom, a silicon atom, a sulfur atom, and a phosphorus atom in a hydrocarbyl group structure, X is each independently selected from the group consisting of a hydrogen atom, a halogen group, a carboxyl group, an alkoxy group having 1 to 20 carbon atoms, and an aryloxy group having 6 to 20 carbon atoms, and z is an integer of 1 to 3.

Specifically, the organoaluminum compound may include dihydrocarbylaluminum hydride such as diethylaluminum hydride, di-n-propylaluminum hydride, diisopropylaluminum hydride, di-n-butylaluminum hydride, diisobutylaluminum hydride (DIBAH), di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, or benzyl-n-octylaluminum hydride; and hydrocarbylaluminum dihydride such as ethylaluminum dihydride, n-propylaluminum dihydride, isopropylaluminum dihydride, n-butylaluminum dihydride, isobutylaluminum dihydride, or n-octylaluminum dihydride.

Also, the alkylating agent may be aluminoxane, and the aluminoxane may be prepared by reacting a trihydrocarbylaluminum-based compound with water. Specifically, the aluminoxane may be linear aluminoxane of the following Formula 3a or cyclic aluminoxane of the following Formula 3b.

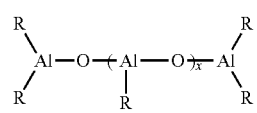 [Formula 3a]

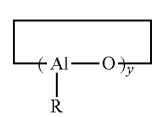 [Formula 3b]

In Formulae 3a and 3b, R is a monovalent organic group bonded to an aluminum atom through a carbon atom, wherein R may be a hydrocarbyl group, and x and y may each independently be an integer of 1 or more, particularly 1 to 100, and more particularly 2 to 50.

Specifically, the aluminoxane may include methylaluminoxane (MAO), modified methylaluminoxane (MMAO), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cylcohexylaluminoxane, 1-methylcyclopentylaluminoxane, phenylaluminoxane, or 2,6-dimethylphenylaluminoxane, and any one thereof or a mixture of two or more thereof may be used.

Furthermore, the modified methylaluminoxane may be one in which a methyl group of methylaluminoxane is substituted with a group (R), specifically, a hydrocarbon group having 2 to 20 carbon atoms, wherein the modified methylaluminoxane may specifically be a compound represented by Formula 4 below.

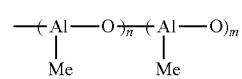 [Formula 4]

In Formula 4, R is the same as defined above, and m and n may each independently be an integer of 2 or more. Also, in Formula 4, Me represents a methyl group.

Specifically, in Formula 4, R may be an alkyl group having 2 to 20 carbon atoms, a cycloalkyl group having 3 to 20 carbon atoms, an alkenyl group having 2 to 20 carbon atoms, a cycloalkenyl group having 3 to 20 carbon atoms, an aryl group having 6 to 20 carbon atoms, an arylalkyl group having 7 to 20 carbon atoms, an alkylaryl group having 7 to 20 carbon atoms, an allyl group, or an alkynyl group having 2 to 20 carbon atoms, may particularly be an alkyl group having 2 to 10 carbon atoms such as an ethyl group, an isobutyl group, a hexyl group, or an octyl group, and may more particularly be an isobutyl group.

More specifically, the modified methylaluminoxane may be one in which about 50 mol % to 90 mol % of the methyl group of the methylaluminoxane is substituted with the above-described hydrocarbon group. When the amount of the hydrocarbon group substituted in the modified methylaluminoxane is within the above range, the modified methylaluminoxane may increase catalytic activity by promoting alkylation.

The modified methylaluminoxane may be prepared by a conventional method, and may specifically be prepared by using trimethylaluminum and alkylaluminum other than trimethylaluminum. In this case, the alkylaluminum may be triisopropylaluminum, triethylaluminum, trihexylaluminum, or trioctylaluminum, and any one thereof or a mixture of two or more thereof may be used.

The organomagnesium compound, as the alkylating agent, is a magnesium compound which includes at least one magnesium-carbon bond and is soluble in a nonpolar solvent, specifically a nonpolar hydrocarbon solvent. Specifically, the organomagnesium compound may be a compound of the following Formula 5a:

 [Formula 5a]

in Formula 5a, R is each independently a monovalent organic group, wherein R is the same as the above-defined R.

More specifically, the organomagnesium compound of Formula 5a may include an alkyl magnesium compound such as diethylmagnesium, di-n-propylmagnesium, diisopropylmagnesium, dibutylmagnesium, dihexylmagnesium, diphenylmagnesium, or dibenzylmagnesium.

Also, the organomagnesium compound may be a compound of the following Formula 5b:

 [Formula 5b]

in Formula 5b, R is a monovalent organic group, wherein R is the same as the above-defined R, and X is selected from the group consisting of a hydrogen atom, a halogen group, a carboxyl group, an alkoxy group, and an aryloxy group.

More specifically, the organomagnesium compound of Formula 5b may include a hydrocarbyl magnesium hydride such as methyl magnesium hydride, ethyl magnesium hydride, butyl magnesium hydride, hexyl magnesium hydride, phenyl magnesium hydride, and benzyl magnesium hydride; a hydrocarbyl magnesium halide such as methyl magnesium chloride, ethyl magnesium chloride, butyl magnesium chloride, hexyl magnesium chloride, phenyl magnesium chloride, benzyl magnesium chloride, methyl magnesium bromide, ethyl magnesium bromide, butyl magnesium bromide, hexyl magnesium bromide, phenyl magnesium bromide, and benzyl magnesium bromide; a hydrocarbyl magnesium carboxylate such as methyl magnesium hexanoate, ethyl magnesium hexanoate, butyl magnesium hexanoate, hexyl magnesium hexanoate, phenyl magnesium hexanoate, and benzyl magnesium hexanoate; a hydrocarbyl magnesium alkoxide such as methyl magnesium ethoxide, ethyl magnesium ethoxide, butyl magnesium ethoxide, hexyl magnesium ethoxide, phenyl magnesium ethoxide, and benzyl magnesium ethoxide; or a hydrocarbyl magnesium aryloxide such as methyl magnesium phenoxide, ethyl magnesium phenoxide, butyl magnesium phenoxide, hexyl magnesium phenoxide, phenyl magnesium phenoxide, and benzyl magnesium phenoxide.

Furthermore, an alkyl lithium of R—Li (where R is an alkyl group having 1 to 20 carbon atoms, for example, a linear alkyl group having 1 to 8 carbon atoms) may be used as the organolithium compound. For example, the organolithium compound may include methyllithium, ethyllithium, isopropyllithium, n-butyllithium, sec-butyllithium, t-butyllithium, isobutyllithium, pentyllithium, and isopentyllithium, and any one thereof or a mixture of two or more thereof may be used.

Among the above-described alkylating agents, diisobutylaluminum hydride (DIBAH) may be preferable in that it may also act as a chain transfer agent during polymerization.

The halide may be used without particular limitation as long as it may act as a halogenating agent, but, for example, may include elemental halogen, an interhalogen compound, halogenated hydrogen, an organic halide, a non-metal halide, a metal halide, or an organic metal halide, and any one thereof or a mixture of two or more thereof may be used. Among them, in consideration of catalytic activity enhancement and the resulting significant improvement in reactivity, any one selected from the group consisting of an organic halide, a metal halide, and an organic metal halide, or a mixture of two or more thereof may be used as the halide.

The elemental halogen may include fluorine, chlorine, bromine, or iodine.

Also, the interhalogen compound may include iodine monochloride, iodine monobromide, iodine trichloride, iodine pentafluoride, iodine monofluoride, or iodine trifluoride.

Furthermore, the halogenated hydrogen may include hydrogen fluoride, hydrogen chloride, hydrogen bromide, or hydrogen iodide.

Also, the organic halide may include t-butyl chloride (t-BuCl), t-butyl bromide, allyl chloride, allyl bromide, benzyl chloride, benzyl bromide, chloro-di-phenylmethane, bromo-di-phenylmethane, triphenylmethyl chloride, triphenylmethyl bromide, benzylidene chloride, benzyliene bromide, methyltrichlorosilane, phenyltrichlorosilane, dimethyldichlorosilane, diphenyldichlorosilane, trimethylchlorosilane (TMSCl), benzoyl chloride, benzoyl bromide, propionyl chloride, propionyl bromide, methyl chloroformate, methyl bromoformate, iodomethane, diiodomethane, triiodomethane (also referred to as 'iodoform'), tetraiodomethane, 1-iodopropane, 2-iodopropane, 1,3-diiodopropane, t-butyl iodide, 2,2-dimethyl-1-iodopropane (also referred to as 'neopentyl iodide'), allyl iodide, iodobenzene, benzyl iodide, diphenylmethyl iodide, triphenylmethyl iodide, benzylidene iodide (also referred to as 'benzal iodide'), trimethylsilyl iodide, triethylsilyl iodide, triphenylsilyl iodide, dimethyldiiodosilane, diethyldiiodosilane, diphenyldiiodosilane, methyltriiodosilane, ethyltriiodosilane, phenyltriiodosilane, benzoyl iodide, propionyl iodide, or methyl iodoformate.

Furthermore, the non-metal halide may include phosphorous trichloride, phosphorous tribromide, phosphorous pentachloride, phosphorous oxychloride, phosphorous oxybromide, boron trifluoride, boron trichloride, boron tribromide, silicon tetrafluoride, silicon tetrachloride (SiCl$_4$), silicon tetrabromide, arsenic trichloride, arsenic tribromide, selenium tetrachloride, selenium tetrabromide, tellurium tetrachloride, tellurium tetrabromide, silicon tetraiodide, arsenic triiodide, tellurium tetraiodide, boron triiodide, phosphorous triiodide, phosphorous oxyiodide, or selenium tetraiodide.

Also, the metal halide may include tin tetrachloride, tin tetrabromide, aluminum trichloride, aluminum tribromide, antimony trichloride, antimony pentachloride, antimony tribromide, aluminum trifluoride, gallium trichloride, gallium tribromide, gallium trifluoride, indium trichloride, indium tribromide, indium trifluoride, titanium tetrachloride, titanium tetrabromide, zinc dichloride, zinc dibromide, zinc difluoride, aluminum triiodide, gallium triiodide, indium triiodide, titanium tetraiodide, zinc diiodide, germanium tetraiodide, tin tetraiodide, tin diiodide, antimony triiodide, or magnesium diiodide.

Furthermore, the organic metal halide may include dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride (EASC), isobutylaluminum sesquichloride, methylmagnesium chloride, methylmagnesium bromide, ethylmagnesium chloride, ethylmagnesium bromide, n-butylmagnesium chloride, n-butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, di-n-butyltin dichloride, di-n-butyltin dibromide, tri-n-butyltin chloride, tri-n-butyltin bromide, methylmagnesium iodide, dimethylaluminum iodide, diethylaluminum iodide, di-n-butylaluminum iodide, diisobutylaluminum iodide, di-n-octylaluminum iodide, methylaluminum diiodide, ethylaluminum diiodide, n-butylaluminum diiodide, isobutylaluminum diiodide, methylaluminum sesquiiodide, ethylaluminum sesquiiodide, isobutylaluminum sesquiiodide, ethylmagnesium iodide, n-butylmagnesium iodide, isobutylmagnesium iodide, phenylmagnesium iodide, benzylmagnesium iodide, trimethyltin iodide, triethyltin iodide, tri-n-butyltin iodide, di-n-butyltin diiodide, or di-t-butyl tin diiodide.

Also, in an embodiment of the present invention, a non-coordinating anion-containing compound or a non-coordinating anion precursor compound may be used instead of the halide or with the halide.

Specifically, in the non-coordinating anion-containing compound, the non-coordinating anion is a sterically bulky anion that does not form a coordinate bond with an active center of a catalyst system due to steric hindrance, wherein the non-coordinating anion may be a tetraarylborate anion or a fluorinated tetraarylborate anion. Also, the compound containing a non-coordinating anion may include a counter cation, for example, a carbonium cation such as a triarylcarbonium cation; an ammonium cation, such as N,N-dialkyl anilinium cation, or a phosphonium cation, in addition to the above-described non-coordinating anion. For example, the compound containing a non-coordinating anion may include triphenylcarbonium tetrakis(pentafluorophenyl)borate, N,N-dimethylanilinium tetrakis(pentafluorophenyl)borate, triphenylcarbonium tetrakis[3,5-bis(trifluoromethyl)phenyl]borate, or N,N-dimethylanilinium tetrakis[3,5-bis(trifluoromethyl)phenyl]borate.

Also, the non-coordinating anion precursor, as a compound capable of forming a non-coordinating anion under the reaction conditions, may include a triaryl boron compound ($BR_3$, where R is a strong electron-withdrawing aryl group such as a pentafluorophenyl group or 3,5-bis(trifluoromethyl)phenyl group).

As described above, the catalyst composition according to the embodiment of the present invention may include the chlorinated reactant of the neodymium compound, the alkylating agent, the conjugated diene-based monomer, and the halide, and the chlorinated reactant is formed by performing a chlorination reaction with the halide after the neodymium compound, the alkylating agent, and the conjugated diene-based monomer undergo an alkylation reaction, wherein the conjugated diene-based monomer in this case may be an additive playing a role in promoting the alkylation reaction of the neodymium compound with the alkylating agent.

Also, the present invention provides a method of preparing the catalyst composition.

The method of preparing the catalyst composition according to an embodiment of the present invention including: preparing a chlorinated reactant by reacting a neodymium compound, an alkylating agent, a first conjugated diene-based monomer, and a halide in the presence of a hydrocarbon solvent (step 1); and reacting the chlorinated reactant with a second conjugated diene-based monomer (step 2), wherein the second conjugated diene-based monomer is used in an amount of 200 mol to 900 mol based on 1 mol of neodymium in the neodymium compound.

Step 1 is a step for preparing a chlorinated reactant, that is, a preforming catalyst composition by reacting a neodymium compound, an alkylating agent, a first conjugated diene-based monomer, and a halide, wherein step 1 may be performed by reacting the neodymium compound, the alkylating agent, the first conjugated diene-based monomer, and the halide in the presence of a hydrocarbon solvent.

The hydrocarbon solvent may be a nonpolar solvent which is not reactive with components of the above-described catalyst composition. Specifically, at least one selected from the group consisting of an aliphatic hydrocarbon solvent such as pentane, hexane, isopentane, heptane, octane, and isooctane; a cycloaliphatic hydrocarbon solvent such as cyclopentane, methylcyclopentane, cyclohexane, methylcyclohexane, and ethylcyclohexane; or an aromatic hydrocarbon solvent, such as benzene, toluene, ethylbenzene, and xylene, may be used as the hydrocarbon solvent. A specific example of the hydrocarbon solvent may be an aliphatic hydrocarbon solvent such as hexane.

In step 1, the reaction may be performed by simultaneously mixing the neodymium compound, the alkylating agent, the first conjugated diene-based monomer, and the halide or may be performed by primarily mixing the neodymium compound, the alkylating agent, and the first conjugated diene-based monomer and then adding the halide to perform secondary mixing.

Specifically, in a case in which the reaction is performed by simultaneously mixing, the neodymium compound, the alkylating agent, the first conjugated diene-based monomer, and the halide are simultaneously added to a reactor and mixed, wherein an alkylation reaction and a chlorination reaction may be sequentially performed by a difference in reactivity between materials in the reactor.

Also, in a case in which the reaction is sequentially performed by primary mixing and secondary mixing, the neodymium compound, the alkylating agent, and the first conjugated diene-based monomer may be added to a reactor and primarily mixed to perform an alkylation reaction, and, thereafter, the halide may be added and secondarily mixed to perform a chlorination reaction.

Furthermore, the reaction may be performed by mixing in a temperature range of 0° C. to 60° C. in terms of promoting formation of catalytically active species.

The neodymium compound, the alkylating agent, the halide, and the first conjugated diene-based monomer may be used in a molar ratio of 1:5 to 200:2 to 20:1 to 100, and, in this case, the prepared catalyst composition may exhibit higher catalytic activity and polymerization reactivity during the polymerization by being used in the preparation of the conjugated diene-based polymer.

Specifically, the alkylating agent may be used in an amount of 5 mol to 200 mol or 5 mol to 20 mol based on 1 mol of the neodymium compound, and may be more specifically used in an amount of 5 mol to 10 mol. If, in a case in which the alkylating agent is used in an amount outside the above range, an activation effect on the neodymium compound is insignificant, catalytic reaction control is not easy, and an excessive amount of the alkylating agent may cause a side reaction.

Also, the halide may be used in an amount of 1 mol to 20 mol or 2 mol to 6 mol based on 1 mol of the neodymium compound, and, in this case, since the formation of the catalytically active species is sufficient, the catalytic activity is excellent, the catalytic reaction control is easy, and a side reaction due to an excessive amount of the halide may not occur.

Furthermore, the first conjugated diene-based monomer may be used in an amount of 1 mol to 100 mol or 20 mol to 50 mol based on 1 mol of the neodymium compound, and the hydrocarbon solvent may be used in an amount of 20 mol to 20,000 mol or 100 mol to 1,000 mol based on 1 mol of the neodymium compound.

Step 2 is a step for preparing a catalyst composition which includes a polymer having a number-average molecular weight of 3,000 g/mol to 10,000 g/mol and including a neodymium compound-derived unit, an alkylating agent-derived unit, and a conjugated diene-based monomer-derived unit, wherein it may be performed by reacting the chlorinated reactant with a second conjugated diene-based monomer.

In this case, the second conjugated diene-based monomer is the same as the first conjugated diene-based monomer, wherein the second conjugated diene-based monomer may be used in an amount of 200 mol to 900 mol, for example, 300 mol to 700 mol based on 1 mol of neodymium in the neodymium compound. In this case, the polymer having a number-average molecular weight of 3,000 g/mol to 10,000 g/mol may be easily formed, and a conjugated diene-based polymer having a narrow molecular weight distribution may be prepared by using the catalyst composition including the polymer.

Also, the reaction in step 2 may be performed by mixing in a temperature range of −20° C. to 40° C. for 5 minutes to 3 hours, and may specifically be performed in a temperature range of 0° C. to 40° C. for 10 minutes to 1 hour. In this case, the polymer may have a narrow molecular weight distribution while having the above number-average molecular weight range, and thus, the conjugated diene-based polymer prepared by using the catalyst composition including the polymer may have a narrow molecular weight distribution while having appropriate linearity.

Furthermore, the present invention provides a method of preparing a neodymium-catalyzed conjugated diene-based polymer by using the catalyst composition.

The method of preparing a conjugated diene-based polymer according to an embodiment of the present invention includes: polymerizing a conjugated diene-based monomer in the presence of the catalyst composition (Step A), wherein the catalyst composition includes a polymer having a number-average molecular weight of 3,000 g/mol to 10,000 g/mol and including a neodymium compound-derived unit; an alkylating agent-derived unit; and a conjugated diene-based monomer-derived unit.

Step A is a polymerization step of polymerizing a conjugated diene-based monomer to prepare a polymer solution containing an active polymer, wherein it may be carried out by polymerizing a conjugated diene monomer in the presence of a neodymium catalyst composition, and in this case, the neodymium catalyst composition may include a polymer having a number-average molecular weight of 3,000 g/mol to 10,000 g/mol and including a neodymium compound-derived unit; an alkylating agent-derived unit; and a conjugated diene-based monomer-derived unit.

Since the method of preparing a neodymium-catalyzed conjugated diene-based polymer according to the present invention does not use a conventionally used preforming catalyst composition, in which alkylation and chlorination are sequentially carried out by sequentially or simultaneously adding a neodymium compound, an alkylating agent, a conjugated diene-based monomer, and a halide to a reactor and mixing, but uses a pre-polymerization catalyst composition including a polymer which is prepared by adding a conjugated diene-based monomer to the preforming catalyst composition at a specific ratio with respect to the neodymium compound in the preforming catalyst composition and being reacted to form the polymer having a number-average molecular weight of 3,000 g/mol to 10,000 g/mol, a conjugated diene-based polymer having a narrower molecular weight distribution than a conjugated diene-based polymer prepared in the presence of the conventional preforming catalyst composition may be prepared, and, as a result, the conjugated diene-based polymer prepared by the preparation method of the present invention may have excellent processability.

Also, the polymerization in step A is to prepare the polymer solution containing an active polymer by polymerization of the conjugated diene-based monomer, wherein it may be performed by radical polymerization, and, for example, it may be bulk polymerization, solution polymerization, suspension polymerization, or emulsion polymerization, and may specifically be solution polymerization. As another example, the polymerization may be performed by any method of batch and continuous methods, and, for example, the polymerization may be performed by adding the conjugated diene-based monomer to the catalyst composition and performing a reaction in a hydrocarbon solvent.

In this case, the hydrocarbon solvent may be the same as described in the catalyst composition, and may be used in an amount such that a concentration of the monomer is in a range of 3 wt % to 90 wt %, or 10 wt % to 30 wt %.

During the polymerization, the catalyst composition may be used in an amount such that neodymium in the catalyst composition is included in an amount of 0.03 mmol to 0.10 mmol based on 1 mol of the conjugated diene-based monomer. In this case, since the catalytic activity is high and an appropriate catalyst concentration is obtained, the polymerization reaction may easily occur.

Furthermore, the polymerization may be performed in a temperature range of 50° C. to 200° C. or 50° C. to 100° C. for 15 minutes to 3 hours or 30 minutes to 2 hours, and, in this case, reaction control may be easy, polymerization reaction rate and efficiency may be excellent, and a cis-1,4 bond content of the active polymer prepared may be high.

Also, according to an embodiment of the present invention, after or during the polymerization reaction, an additive, for example, a reaction terminating agent for the completion of the polymerization reaction, such as polyoxyethylene glycol phosphate; or an antioxidant, such as 2,6-di-t-butylparacresol, may be further used. In addition, an additive that usually facilitates solution polymerization, specifically, an additive, such as a chelating agent, a dispersant, a pH adjuster, a deoxidizer, or an oxygen scavenger, may be further selectively used.

Furthermore, in the polymerization reaction, in order not to deactivate the catalyst composition and polymer, for example, it may be desirable to prevent incorporation of a deactivating compound, such as oxygen, water, and carbon dioxide gas, in a polymerization reaction system.

As a result of the above-described polymerization reaction, an active polymer including an organometallic site, which is activated from the catalyst composition including the neodymium compound, for example, a neodymium-catalyzed conjugated diene-based polymer containing a 1,3-butadiene monomer unit is formed, and the prepared conjugated diene-based polymer may have pseudo-living characteristics.

The preparation method according to the embodiment of the present invention may further include a modification reaction step of reacting the active polymer with a modifier.

Herein, the modification reaction may be performed by a solution reaction or solid-phase reaction, and, as a specific example, the modification reaction may be performed by the solution reaction. As another example, the modification reaction may be performed using a batch-type reactor and may be continuously performed using a device such as a multistage continuous reactor or in-line mixer.

As another example, the modification reaction may be performed under the same temperature and pressure conditions as a conventional polymerization reaction and, as a specific example, the modification reaction may be performed at a temperature of 20° C. to 100° C., wherein, within the above range, viscosity of the polymer is not increased, and there is an effect that the activated end of the polymer is not deactivated.

Also, a compound capable of providing a functional group to the active polymer or increasing a molecular weight by coupling may be used as the modifier, wherein, for example, the modifier may be a compound which includes at least one functional group selected from the group consisting of an azacyclopropane group, a ketone group, a carboxyl group, a thiocarboxyl group, a carbonate, a carboxylic anhydride, a carboxylic acid metal salt, an acid halide, an urea group, a thiourea group, an amide group, a thioamide group, an isocyanate group, a thioisocyanate group, a halogenated isocyanate group, an epoxy group, a thioethoxy group, an imine group, and a Y—Z bond (where Y is tin (Sn), silicon (Si), germanium (Ge), or phosphorus (P), and Z is a halogen atom) and does not include an active proton and an onium salt.

After the completion of the above-described modification reaction, the polymerization reaction may be stopped by adding an isopropanol solution of 2,6-di-t-butyl-p-cresol (BHT) to a polymerization reaction system. Thereafter, a conjugated diene-based polymer may be obtained through a desolvation treatment, such as steam stripping in which a partial pressure of the solvent is reduced by supplying water vapor, or a vacuum drying treatment. Also, in addition to the above-described modified conjugated diene-based polymer, an unmodified active polymer may be included in a reaction product obtained as a result of the above-described modification reaction.

The method of preparing a conjugated diene-based polymer according to the embodiment of the present invention may further include precipitation and separation processes for the prepared conjugated diene-based polymer. Filtration, separation, and drying processes for the precipitated conjugated diene-based polymer may be performed according to a conventional method.

As described above, according to the method of preparing a conjugated diene-based polymer according to the embodiment of the present invention, a conjugated diene-based polymer having good physical properties including a narrow molecular weight distribution, for example, a neodymium-catalyzed butadiene-based polymer may be prepared.

Furthermore, the present invention provides a neodymium-catalyzed conjugated diene-based polymer prepared by the above-described preparation method.

The neodymium-catalyzed conjugated diene-based polymer according to an embodiment of the present invention is characterized in that a –S/R (stress/relaxation) value at 100° C. is in a range of 0.5 to 0.9, and a molecular weight distribution is in a range of 1.0 or more to less than 3.0. Specifically, the polymer may have a –S/R (stress/relaxation) value at 100° C. of 0.6 to 0.8, and may have a molecular weight distribution of 2.0 or more to less than 3.0. If, in a case in which the polymer has the above ranges of the –S/R value and the molecular weight distribution, since it has appropriate linearity, processability and mixing properties may be excellent with balance, and thus, tensile properties and viscoelasticity may be excellent while exhibiting high processability.

Also, the neodymium-catalyzed conjugated diene-based polymer according to the embodiment of the present invention may have a weight-average molecular weight (Mw) of $4 \times 10^5$ g/mol to $1.0 \times 10^6$ g/mol and may have a number-average molecular weight (Mn) of $2.0 \times 10^5$ g/mol to $5.0 \times 10^5$ g/mol while simultaneously satisfying the above-described molecular weight distribution condition, and, since the tensile properties are excellent and the processability is excellent when the neodymium-catalyzed conjugated diene-based polymer is used in a rubber composition within the above ranges, mixing and kneading are easy due to an improvement in workability of the rubber composition, and thus, there is an effect that a balance between mechanical properties and physical properties of the rubber composition is excellent. The weight-average molecular weight, for example, may be in a range of $4.5 \times 10^5$ g/mol to $1.0 \times 10^6$ g/mol or $5 \times 10^5$ g/mol to $1.0 \times 10^6$ g/mol, and the number-average molecular weight, for example, may be in a range of $2.0 \times 10^5$ g/mol to $4.5 \times 10^5$ g/mol or $2.0 \times 10^5$ g/mol to $4.0 \times 10^5$ g/mol.

More specifically, in a case in which the conjugated diene-based polymer according to the embodiment of the present invention simultaneously satisfies the weight-average molecular weight (Mw) and number-average molecular weight (Mn) conditions as well as the above-described molecular weight distribution, the tensile properties, viscoelasticity, and processability for the rubber composition are excellent when used in the rubber composition, and there is an effect that a physical property balance therebetween is excellent.

Furthermore, the conjugated diene-based polymer according to the embodiment of the present invention may have a Mooney viscosity measured at 100° C. of 30 or more to 70 or less, and there is an effect of exhibiting better processability within the above range. Specifically, the Mooney viscosity may be in a range of 40 to 60.

Also, the conjugated diene-based polymer may have a cis-1,4 bond content of a conjugated diene portion, which is measured by Fourier transform infrared spectroscopy (FT-IR), of 95% or more, for example, 97% or more. Thus, abrasion resistance, crack resistance, and ozone resistance of the rubber composition may be improved when used in the rubber composition.

Furthermore, the conjugated diene-based polymer may have a vinyl content (vinyl-1,2-bond content) of the conjugated diene portion, which is measured by Fourier transform infrared spectroscopy, of 5% or less, particularly 3% or less, and more particularly 1% or less. In a case in which the vinyl content in the polymer is greater than 5%, the abrasion resistance, crack resistance, and ozone resistance of the rubber composition including the same may be deteriorated.

Herein, the cis-1,4 bond content and vinyl content in the polymer are measured by the Fourier transform infrared spectroscopy (FT-IR) in which, after measuring a FT-IR transmittance spectrum of a carbon disulfide solution of the conjugated diene-based polymer which is prepared at a concentration of 5 mg/mL by using disulfide carbon of the same cell as a blank, each content was obtained by using a maximum peak value (a, base line) near 1,130 $cm^{-1}$ of the measurement spectrum, a minimum value (b) near 967 $cm^{-1}$ which indicates a trans-1,4 bond, a minimum value (c) near 911 $cm^{-1}$ which indicates a vinyl bond, and a minimum value (d) near 736 $cm^{-1}$ which indicates a cis-1,4 bond.

Also, the neodymium-catalyzed conjugated diene-based polymer in the present invention may represent a conjugated diene-based polymer including an organometallic site which is derived from the catalyst composition including the neodymium compound, that is, which is activated from a catalyst. Specifically, the conjugated diene-based polymer may be a neodymium-catalyzed butadiene-based polymer including a 1,3-butadiene monomer-derived repeating unit.

Furthermore, the conjugated diene-based polymer according to the embodiment of the present invention may be a butadiene homopolymer such as polybutadiene, or may be a butadiene copolymer such as a butadiene-isoprene copolymer.

As a specific example, the conjugated diene-based polymer may include 80 wt % to 100 wt % of a 1,3-butadiene monomer-derived repeating unit and selectively 20 wt % or less of a repeating unit derived from other conjugated diene-based monomer which may be copolymerized with 1,3-butadiene, wherein there is an effect that the cis-1,4 bond content in the polymer is not reduced within the above range. In this case, the 1,3-butadiene monomer may include 1,3-butadiene, such as 1,3-butadiene, 2,3-dimethyl-1,3-butadiene, or 2-ethyl-1,3-butadiene, or a derivative thereof, and the other conjugated diene-based monomer, which may be copolymerized with 1,3-butadiene, may include 2-methyl-1,3-pentadiene, 1,3-pentadiene, 3-methyl-1,3-pentadiene, 4-methyl-1,3-pentadiene, 1,3-hexadiene, or 2,4 hexadiene, and any one thereof or a compound of two or more thereof may be used.

In the present invention, the activated organometallic site of the conjugated diene-based polymer may be an activated organometallic site at an end of the conjugated diene-based polymer (activated organometallic site at a molecular chain end), an activated organometallic site in a main chain, or an activated organometallic site in a side chain, and, among them, in a case in which the activated organometallic site of the conjugated diene-based polymer is obtained by anionic polymerization or coordination anionic polymerization, the activated organometallic site may be the activated organometallic site at the end.

In addition, the present invention provides a rubber composition including the above neodymium-catalyzed conjugated diene-based polymer and a molded article prepared from the rubber composition.

The rubber composition according to an embodiment of the present invention may include the conjugated diene-based polymer in an amount of 0.1 wt % or more to 100 wt % or less, particularly 10 wt % to 100 wt %, and more particularly 20 wt % to 90 wt %. In a case in which the amount of the conjugated diene-based polymer is less than 0.1 wt %, an effect of improving abrasion resistance and crack resistance of a molded article prepared by using the rubber composition, for example, a tire, may be insignificant.

Also, the rubber composition may further include other rubber components, if necessary, in addition to the conjugated diene-based polymer, and, in this case, the rubber component may be included in an amount of 90 wt % or less based on a total weight of the rubber composition. Specifically, the rubber component may be included in an amount of 1 part by weight to 900 parts by weight based on 100 parts by weight of the conjugated diene-based polymer.

The rubber component may be a natural rubber or a synthetic rubber, and, for example, the rubber component may be a natural rubber (NR) including cis-1,4-polyisoprene; a modified natural rubber, such as an epoxidized natural rubber (ENR), a deproteinized natural rubber (DPNR), and a hydrogenated natural rubber, in which the general natural rubber is modified or purified; and a synthetic rubber such as a styrene-butadiene rubber (SBR), polybutadiene (BR), polyisoprene (IR), a butyl rubber (IIR), an ethylene-propylene copolymer, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), a polysulfide rubber, an acrylic rubber, an urethane rubber, a silicon rubber, an epichlorohydrin rubber, and a halogenated butyl rubber. Any one thereof or a mixture of two or more thereof may be used.

Furthermore, the rubber composition may include 0.1 part by weight to 150 parts by weight of a filler based on 100 parts by weight of the conjugated diene-based polymer, and the filler may include a silica-based filler, a carbon black-based filler, or a combination thereof. Specifically, the filler may be carbon black.

The carbon black-based filler is not particularly limited, but, for example, may have a nitrogen adsorption specific surface area per gram ($N_2SA$, measured according to JIS K 6217-2:2001) of 20 $m^2/g$ to 250 $m^2/g$. Also, the carbon black may have a dibutyl phthalate (DBP) oil absorption of 80 cc/100 g to 200 cc/100 g. If the nitrogen adsorption specific surface area per gram of the carbon black is greater than 250 $m^2/g$, processability of the rubber composition may be reduced, and, if the nitrogen adsorption specific surface area per gram of the carbon black is less than 20 $m^2/g$, reinforcement by carbon black may be insignificant. Furthermore, if the DBP oil absorption of the carbon black is greater than 200 cc/100 g, the processability of the rubber composition may be reduced, and, if the DBP oil absorption of the carbon black is less than 80 cc/100 g, the reinforcement by carbon black may be insignificant.

Also, the silica-based filler is not particularly limited, but, for example, may include wet silica (hydrous silicic acid), dry silica (anhydrous silicic acid), calcium silicate, aluminum silicate, or colloidal silica. Specifically, the silica-based filler may be wet silica in which an effect of improving both fracture characteristics and wet grip is the most significant. Furthermore, the silica may have a nitrogen adsorption specific surface area ($N_2SA$) of 120 $m^2/g$ to 180 $m^2/g$, and a cetyltrimethylammonium bromide (CTAB) surface area per gram of 100 $m^2/g$ to 200 $m^2/g$. If the nitrogen adsorption specific surface area per gram of the silica is less than 120 $m^2/g$, reinforcement by silica may be insignificant, and, if the nitrogen adsorption specific surface area per gram of the silica is greater than 180 $m^2/g$, the processability of the rubber composition may be reduced. Also, if the CTAB surface area per gram of the silica is less than 100 $m^2/g$, the reinforcement by silica, as the filler, may be insignificant, and, if the CTAB surface area per gram of the silica is greater than 200 $m^2/g$, the processability of the rubber composition may be reduced.

In a case in which silica is used as the filler, a silane coupling agent may be used together for the improvement of reinforcement and low heat generation property.

Specific examples of the silane coupling agent may be bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl) tetrasulfide, bis(2-trimethoxysilylethyl)tetrasulfide, 3-mercaptopropyl trimethoxysilane, 3-mercaptopropyl triethoxysilane, 2-mercaptoethyl trimethoxysilane, 2-mercaptoethyl triethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropyl benzothiazolyl tetrasulfide, 3-triethoxysilylpropyl benzoyl tetrasulfide, 3-triethoxysilylpropyl methacrylate monosulfide, 3-trimethoxysilylpropyl methacrylate monosulfide, bis(3-diethoxymethylsilylpropyl)tetrasulfide, 3-mercaptopropyl dimethoxymethylsilane, dimethoxymethylsilylpropyl-N,N-dimethylthiocarbamoyl tetrasulfide, or dimethoxymethylsilylpropyl benzothiazolyl tetrasulfide, and any one thereof or a mixture of two or more thereof may be used. For example, in consideration of the effect of improving the reinforcement, the silane coupling agent may be bis(3-triethoxysilylpropyl)polysulfide or 3-trimethoxysilylpropyl benzothiazyl tetrasulfide.

Also, the rubber composition according to the embodiment of the present invention may be sulfur cross-linkable, and, accordingly, may further include a vulcanizing agent.

The vulcanizing agent may specifically be sulfur powder, and may be included in an amount of 0.1 part by weight to 10 parts by weight based on 100 parts by weight of the rubber component. When the vulcanizing agent is included within the above range, elastic modulus and strength required for the vulcanized rubber composition may be secured and, simultaneously, a low fuel consumption property may be obtained.

Furthermore, the rubber composition according to the embodiment of the present invention may further include various additives, such as a vulcanization accelerator, process oil, a plasticizer, an antioxidant, a scorch inhibitor, zinc white, stearic acid, a thermosetting resin, or a thermoplastic resin, used in the general rubber industry, in addition to the above-described components.

The vulcanization accelerator is not particularly limited, but, specifically, a thiazole-based compound, such as 2-mercaptobenzothiazole (M), dibenzothiazyl disulfide (DM), and N-cyclohexylbenzothiazole-2-sulfenamide (CZ), or a guanidine-based compound, such as diphenylguanidine (DPG), may be used. The vulcanization accelerator may be included in an amount of 0.1 part by weight to 5 parts by weight based on 100 parts by weight of the rubber component.

Also, the process oil acts as a softener in the rubber composition, wherein the process oil may be a paraffin-based, naphthenic-based, or aromatic-based compound, and, for example, the aromatic-based compound may be used in consideration of tensile strength and abrasion resistance, and the naphthenic-based or paraffin-based process oil may be used in consideration of hysteresis loss and low temperature characteristics. The process oil may be included in an amount of 100 parts by weight or less based on 100 parts by weight of the rubber component, and, when the process oil is included in the above amount, decreases in tensile strength and low heat generation property (low fuel consumption property) of the vulcanized rubber may be prevented.

Furthermore, specific examples of the antioxidant may be N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, or a high-temperature condensate of diphenylamine and acetone. The antioxidant may be used in an amount of 0.1 part by weight to 6 parts by weight based on 100 parts by weight of the rubber component.

The rubber composition according to the embodiment of the present invention may be obtained by kneading the above mixing formulation using a kneader such as a Banbury mixer, a roll, and an internal mixer, and a rubber composition having excellent abrasion resistance as well as low heat generation property may also be obtained by a vulcanization process after molding.

Accordingly, the rubber composition may be suitable for the preparation of each member of a tire, such as a tire's tread, an under tread, a sidewall, a carcass coating rubber, a belt coating rubber, a bead filler, a chafer, or a bead coating rubber, or various industrial rubber products such as an anti-vibration rubber, a belt conveyor, and a hose.

The molded article prepared by using the rubber composition may include a tire or a tire's tread.

Hereinafter, the present invention will be described in more detail, according to specific examples. However, the following examples are merely presented to exemplify the present invention, and the scope of the present invention is not limited thereto.

EXAMPLE 1

After neodymium versatate (NdV, Nd(2-ethylhexanoate)$_3$) was added in a hexane solvent under a nitrogen condition and diisobutylaluminum hydride (DIBAH), diethylaluminum chloride (DEAC), and 1,3-butadiene were sequentially added such that a molar ratio of NdV:DIBAH:DEAC:1,3-butadiene was 1:10:3:30, mixing is performed at 20° C. for 12 hours to prepare a chlorination reactant (preforming catalyst composition). 200 mol of 1,3-butadiene (BD) based on 1 mol of neodymium (Nd) was slowly added thereto at 0° C. and stirred for 60 minutes to prepare a catalyst composition. The prepared catalyst composition was used after storage at 0° C. under a nitrogen condition for 24 hours.

EXAMPLE 2

A catalyst composition was prepared in the same manner as in Example 1 except that 1,3-butadiene (BD) was slowly added to the chlorination reactant at 20° C. and stirred for 30 minutes in Example 1. The prepared catalyst composition was used after storage at 0° C. under a nitrogen condition for 24 hours.

EXAMPLE 3

A catalyst composition was prepared in the same manner as in Example 1 except that 1,3-butadiene (BD) was slowly added to the chlorination reactant at 40° C. and stirred for 10 minutes in Example 1. The prepared catalyst composition was used after storage at 0° C. under a nitrogen condition for 24 hours.

EXAMPLE 4

A catalyst composition was prepared in the same manner as in Example 1 except that 900 mol of 1,3-butadiene (BD) based on 1 mol of Nd was slowly added to the chlorination reactant at 0° C. and stirred for 60 minutes in Example 1. The prepared catalyst composition was used after storage at 0° C. under a nitrogen condition for 24 hours.

COMPARATIVE EXAMPLE 1

After neodymium versatate (NdV, Nd(2-ethylhexanoate)$_3$) was added in a hexane solvent under a nitrogen condition and diisobutylaluminum hydride (DIBAH), diethylaluminum chloride (DEAC), and 1,3-butadiene were sequentially added such that a molar ratio of NdV:DIBAH:DEAC:1,3-butadiene was 1:9~10:2~3:30, mixing is performed at 20° C. for 12 hours to prepare a catalyst composition. The prepared catalyst composition was used after storage at 0° C. under a nitrogen condition for 24 hours.

COMPARATIVE EXAMPLE 2

A catalyst composition was prepared in the same manner as in Example 1 except that 70 mol of 1,3-butadiene (BD) based on 1 mol of Nd was slowly added to the chlorination reactant at 0° C. and stirred for 60 minutes in Example 1. The prepared catalyst composition was used after storage at 0° C. under a nitrogen condition for 24 hours.

COMPARATIVE EXAMPLE 3

A catalyst composition was prepared in the same manner as in Example 1 except that 1,800 mol of 1,3-butadiene (BD) based on 1 mol of Nd was slowly added to the chlorination reactant at 0° C. and stirred for 60 minutes in Example 1. The prepared catalyst composition was used after storage at 0° C. under a nitrogen condition for 24 hours.

EXPERIMENTAL EXAMPLE 1

An amount of a polymer in each composition and a number-average molecular weight of the polymer were measured for each of the catalyst compositions prepared in Examples 1 to 4 and Comparative Examples 1 to 3. The results thereof are presented in Table 1 below.

1) Amount of Polymer

Each catalyst composition was added to isopropyl alcohol and stirred to collect precipitates and the precipitates were dried in a drying oven. A weight of a solid obtained by the drying was measured, and an amount of a polymer in the catalyst composition was calculated through the following Equation 1.

$$\text{Polymer amount (wt \%)} = \{\text{weight (g) of solid/weight (g) of catalyst composition}\} \times 100 \quad \text{[Equation 1]}$$

2) Number-Average Molecular Weight and Molecular Weight Distribution of Polymer

After each catalyst composition was dissolved in tetrahydrofuran (THF) at 40° C. for 30 minutes, a weight-average molecular weight and a number-average molecular weight were measured using gel permeation chromatography (GPC), and a molecular weight distribution was calculated as a ratio of the weight-average molecular weight to the number-average molecular weight. In this case, two PLgel Olexis (product name) columns by Polymer Laboratories and one PLgel mixed-C (product name) column by Polymer Laboratories were combined and used as a column, all newly replaced columns were mixed-bed type columns, and polystyrene was used as a GPC standard material.

TABLE 1

| Category | Example | | | | Comparative Example | | |
|---|---|---|---|---|---|---|---|
| | 1 | 2 | 3 | 4 | 1 | 2 | 3 |
| Amount (wt %) | 18.5 | 20.1 | 21.0 | 53.3 | — | 9.2 | 86.5 |
| Number-average molecular weight (g/mol) | 3,000 | 3,000 | 3,000 | 10,000 | — | 1,000 | 20,000 |
| Molecular weight distribution | 2.51 | 2.53 | 2.77 | 2.58 | 2.90 | 2.85 | 2.87 |

From Table 1, it was confirmed that the polymers having a number-average molecular weight of 3,000 g/mol to 10,000 g/mol and a molecular weight distribution of 2.5 to 2.8 were present in the catalyst compositions of Examples 1 to 4.

EXAMPLE 5

After alternatingly applying vacuum and nitrogen to a completely dried reactor, 4.2 kg of hexane and 500 g of 1,3-butadiene were added to the 15 L reactor in vacuum, temperature of the reactor was increased to 70° C. After the catalyst composition of Example 1 was added thereto, polymerization was performed for 60 minutes to prepare an active polymer. In this case, a conversion rate of the 1,3-butadiene into a polybutadiene polymer was 100%. Thereafter, a hexane solution including 1.0 g of a polymerization terminator and a hexane solution including 2.0 g of an antioxidant were added to terminate the reaction, and a butadiene polymer was prepared.

EXAMPLE 6

A butadiene polymer was prepared in the same manner as in Example 5 except that, in Example 5, the catalyst composition of Example 2 was used instead of the catalyst composition of Example 1.

EXAMPLE 7

A butadiene polymer was prepared in the same manner as in Example 5 except that, in Example 5, the catalyst composition of Example 3 was used instead of the catalyst composition of Example 1.

EXAMPLE 8

A butadiene polymer was prepared in the same manner as in Example 5 except that, in Example 5, the catalyst composition of Example 4 was used instead of the catalyst composition of Example 1.

COMPARATIVE EXAMPLE 4

A butadiene polymer was prepared in the same manner as in Example 5 except that, in Example 5, the catalyst composition of Comparative Example 1 was used instead of the catalyst composition of Example 1.

COMPARATIVE EXAMPLE 5

A butadiene polymer was prepared in the same manner as in Example 5 except that, in Example 5, the catalyst composition of Comparative Example 2 was used instead of the catalyst composition of Example 1.

COMPARATIVE EXAMPLE 6

A butadiene polymer was prepared in the same manner as in Example 5 except that, in Example 5, the catalyst composition of Comparative Example 3 was used instead of the catalyst composition of Example 1.

1) Microstructural Analysis

Cis-1,4 bond content, trans-1,4 bond content, and vinyl-1,2 bond content of a conjugated diene portion were measured by Fourier transform infrared spectroscopy (FT-IR).

Specifically, after measuring a FT-IR transmittance spectrum of a carbon disulfide solution of the conjugated diene-based polymer which is prepared at a concentration of 5 mg/mL by using disulfide carbon of the same cell as a blank, each content was obtained by using a maximum peak value (a, base line) near 1,130 $cm^{-1}$ of the measurement spectrum, a minimum value (b) near 967 $cm^{-1}$ which indicates a trans-1,4 bond, a minimum value (c) near 911 $cm^{-1}$ which indicates a vinyl bond, and a minimum value (d) near 736 $cm^{-1}$ which indicates a cis-1,4 bond.

2) Weight-Average Molecular Weight (Mw), Number-Average Molecular Weight (Mn), and Molecular Weight Distribution (MWD)

Each polymer was dissolved in tetrahydrofuran (THF) at 40° C. for 30 minutes, and then loaded and flowed into a gel permeation chromatography (GPC) column. In this case, as the column, two PLgel Olexis (product name) columns by Polymer Laboratories and one PLgel mixed-C (product name) column by Polymer Laboratories were combined and used. Also, all newly replaced columns were mixed-bed type columns, and polystyrene was used as a GPC standard material.

3) Mooney Viscosity (MV, ML1+4, @100° C.) (MU) and −S/R (Stress/Relaxation) Value Mooney viscosity (ML1+4, @100° C.) (MU) of each polymer was measured with a large rotor at a rotor speed of 2±0.02 rpm at 100° C. using MV2000E by Monsanto Company. After each polymer was left standing for 30 minutes or more at room temperature (23±3° C.), 27±3 g of each polymer was taken as a sample used in this case and filled into a die cavity, and Mooney viscosity was measured while applying a torque by operating a platen. Also, a −S/R value (absolute value) was obtained by measuring a slope of change in the Mooney viscosity obtained while the torque was released.

TABLE 2

| | | Example | | | | Comparative Example | | |
|---|---|---|---|---|---|---|---|---|
| Category | | 5 | 6 | 7 | 8 | 4 | 5 | 6 |
| Microstructural analysis | Cis-1,4 bond | 96.9 | 96.7 | 96.8 | 96.5 | 96.7 | 96.6 | 96.9 |
| | Trans-1,4 bond | 2.4 | 2.4 | 2.3 | 2.7 | 2.3 | 2.5 | 2.3 |
| | Vinyl-1,2 bond | 0.7 | 0.9 | 0.9 | 0.8 | 1.0 | 0.9 | 0.8 |
| GPC results | Mn (×$10^5$ g/mol) | 2.65 | 2.71 | 2.75 | 2.54 | 2.68 | 2.43 | 2.60 |
| | Mw (×$10^5$ g/mol) | 7.23 | 7.61 | 8.08 | 6.86 | 8.33 | 7.41 | 7.93 |
| | MWD (Mw/Mn) | 2.73 | 2.81 | 2.94 | 2.70 | 3.11 | 3.05 | 3.05 |
| Viscosity properties | Mooney viscosity (MV) | 44 | 46 | 45 | 43 | 46 | 41 | 48 |
| | −S/R | 0.7148 | 0.6820 | 0.6107 | 0.6623 | 0.6017 | 0.6183 | 0.6234 |

EXPERIMENTAL EXAMPLE 2

Microstructural analysis, a number-average molecular weight (Mn), a weight-average molecular weight (Mw), a molecular weight distribution (MWD), Mooney viscosity (MV), and a −S/R value were measured for each of the polymers prepared in Examples 5 to 8 and Comparative Examples 4 to 6 by the following methods. The results thereof are presented in Table 2 below.

As illustrated in Table 2, all of the polymers of Examples 5 to 8 according to the embodiment of the present invention had a molecular weight distribution of 3.0 or less, wherein the polymers of Examples 5 to 8 exhibited the molecular weight distributions which were significantly decreased by about 6% to about 13% in comparison to the polymer of Comparative Example 4 using the conventional preforming catalyst composition.

Also, with respect to Comparative Examples 5 and 6 in which the catalyst compositions each including the polymer were used, but the number-average molecular weights of the polymers were outside a range of 3,000 g/mol to 10,000 g/mol, since both of molecular weight distributions were greater than 3.0, Comparative Examples 5 and 6 each exhibited a wide molecular weight distribution, and thus, Comparative Examples 5 and 6 respectively had the molecular weight distributions considerably increased in comparison to those of the examples.

From the results of Table 1 and Table 2, it may be confirmed that, in a case in which the number-average molecular weight and molecular weight distribution of the polymer were not controlled in a specific range even if the polymer was included in the catalyst composition, the molecular weight distribution of the polymer prepared may not be controlled.

The invention claimed is:

1. A catalyst composition comprising a polymer, wherein the polymer comprises:
    a neodymium compound-derived unit;
    an alkylating agent-derived unit; and
    a conjugated diene-based monomer-derived unit, and
    the polymer has a number-average molecular weight of 3,000 g/mol to 10,000 g/mol.

2. The catalyst composition of claim 1, wherein the catalyst composition comprises the polymer in an amount of 10 wt % or more to less than 60 wt %.

3. The catalyst composition of claim 1, wherein the polymer has a molecular weight distribution of 2.3 to 2.8.

4. The catalyst composition of claim 1, further comprising a halogenated reactant of the neodymium compound, the alkylating agent, the conjugated diene-based monomer, and a halide.

5. The catalyst composition of claim 1, wherein the neodymium compound is a compound represented by Formula 1:

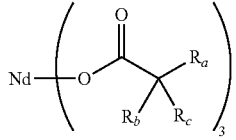

[Formula 1]

wherein,
$R_a$ to $R_c$ are each independently hydrogen or an alkyl group having 1 to 12 carbon atoms, provided that at least one of $R_a$, $R_b$ or $R_c$ is not hydrogen.

6. The catalyst composition of claim 1, wherein the alkylating agent comprises an organoaluminum compound of Formula 2:

$Al(R)_z(X)_{3-z}$    [Formula 2]

wherein,
R is each independently a hydrocarbyl group having 1 to 30 carbon atoms, or a heterohydrocarbyl group having 1 to 30 carbon atoms which contains at least one heteroatom of a nitrogen atom, an oxygen atom, a boron atom, a silicon atom, a sulfur atom, or a phosphorus atom;

X is each independently selected from the group consisting of a hydrogen atom, a halogen group, a carboxyl group, an alkoxy group having 1 to 20 carbon atoms, and an aryloxy group having 6 to 20 carbon atoms, and z is an integer of 1 to 3.

7. A method of preparing a neodymium-catalyzed conjugated diene-based polymer, comprising:
    polymerizing a third conjugated diene-based monomer in the presence of the catalyst composition of claim 1,
    wherein the catalyst composition comprises a polymer having a number-average molecular weight of 3,000 g/mol to 10,000 g/mol and including a neodymium compound-derived unit; an alkylating agent-derived unit; and a conjugated diene-based monomer-derived unit.

8. The method of claim 7, wherein, during the polymerization, the catalyst composition is in an amount such that neodymium in the catalyst composition is included in an amount of 0.03 mmol to 0.10 mmol based on 1 mol of the third conjugated diene-based monomer.

9. The method of claim 7, wherein the polymerization is performed in a temperature range of 50° C. to 200° C.

10. A method of preparing a catalyst composition, the method comprising:
    preparing a halogenated reactant by reacting a neodymium compound, an alkylating agent, a first conjugated diene-based monomer, and a halide in the presence of a hydrocarbon solvent; and
    reacting the halogenated reactant with a second conjugated diene-based monomer,
    wherein the second conjugated diene-based monomer is in an amount of 200 mol to 900 mol based on 1 mol of neodymium in the neodymium compound.

11. The method of claim 10, wherein the reacting the halogenated reactant with the second conjugated diene-based monomer is performed in a temperature range of −20° C. to 40° C. for 5 minutes to 3 hours.

12. The method of claim 10, wherein the neodymium compound, the alkylating agent, the halide, and the first conjugated diene-based monomer are in a molar ratio of 1:5 to 200:2 to 20:1 to 100.

* * * * *